United States Patent [19]

Eaton et al.

[11] 4,342,446
[45] Aug. 3, 1982

[54] SELF-LEVELING VISCOUS ELASTIC DAMPER

[75] Inventors: Gerald E. Eaton, Wakeman; Emile M. Shtarkman; Daniel S. Snyder, both of Norwalk, all of Ohio

[73] Assignee: Gould Inc., Cleveland, Ohio

[21] Appl. No.: 207,914

[22] Filed: Nov. 18, 1980

[51] Int. Cl.³ ............................................. F16F 9/08
[52] U.S. Cl. .................................... 267/35; 267/64.17
[58] Field of Search ............... 188/298; 267/35, 64.15, 267/64.17, 64.19, 64.27; 280/DIG. 1

[56] References Cited

U.S. PATENT DOCUMENTS

| | | | |
|---|---|---|---|
| 2,545,857 | 3/1951 | Perkins et al. | 31/86 |
| 2,818,249 | 12/1957 | Boschi | 267/33 |
| 3,509,795 | 5/1970 | Woodward | 92/92 |
| 3,658,314 | 4/1972 | Luzsicza | 267/121 |
| 3,701,322 | 10/1972 | Carle | 105/197 |
| 3,717,105 | 2/1973 | Novotny | 105/197 |
| 3,941,149 | 3/1976 | Mittleman | 137/493.1 |
| 4,054,152 | 10/1977 | Ito et al. | 137/512 |
| 4,126,084 | 11/1978 | Inada et al. | 91/443 |

FOREIGN PATENT DOCUMENTS

| | | |
|---|---|---|
| 2253269 | 10/1972 | Fed. Rep. of Germany . |
| 1152494 | 9/1957 | France . |
| 942729 | 11/1963 | United Kingdom . |

*Primary Examiner*—Duane A. Reger
*Attorney, Agent, or Firm*—Russell E. Baumann

[57] ABSTRACT

A self-leveling viscous elastic damper comprising an inner member at least partially received in an outer member and joined to the outer member with an elastomeric shear spring. A main fluid chamber is included in the outer member in communication with a second fluid chamber in the inner member through restricted orifice means. A third fluid chamber, separated from the main fluid chamber by a partitioning wall, is also included in the outer member. An elastomeric bladder for selective gas pressurization is disposed in the second fluid chamber. An elastomeric gas accumulator for selective gas pressurization is disposed in the third fluid chamber. Pump means extend through the partitioning wall for pumping fluid from the third fluid chamber to the main fluid chamber. An elastomeric diaphragm in the main fluid chamber connects the pump means to a peripheral wall of the outer member.

18 Claims, 4 Drawing Figures

SELF-LEVELING VISCOUS ELASTIC DAMPER

BACKGROUND OF THE INVENTION

The present invention relates generally to shock absorbers and levelers of structural agitation. More particularly, it relates to shock absorbers of the type which use both an elastomeric shear spring and flow of fluid through a restricted orifice for absorbing shock, dissipating energy and leveling of support structure such as are commonly used on automobiles and other vehicles. However, it will be appreciated to those skilled in the art that the invention can be readily adapted for use in other environments as, for example, where similar damping and leveling devices are employed to absorb shock and dissipate energy.

Known shock absorbers of the type described include those disclosed in commonly assigned U.S. patent application Ser. No. 950,949, filed Oct. 13, 1978 in the name of L. Dale Coad. In the Coad application an expandible and contractible elastomeric bladder for separating a gas chamber from a fluid chamber in a viscous spring damper was provided for varying the spring rate of the damper, calibrating the damper or leveling a load supported thereby.

Dynamic operating characteristics of prior art self-leveling dampers are chiefly limited to spring rate, damping response, leveling response, cyclical active energy consumption and a dissipation percentage thereof. In prior art devices, dynamic testing has established that such operating characteristics have varied during leveling operations. Such variable dynamic operating characteristics are undesirable, particularly where a high spring rate and low damping response results in a rough ride in a vehicle containing such devices.

In addition, separate vehicle suspension has been needed in conjunction with prior art self-leveling dampers since such prior devices have no load capacity.

The present invention contemplates a new and improved self-leveling viscous spring damper which exhibits improved operating characteristics over prior viscous spring dampers, is self-contained, and can be used as a complete suspension. The invention is simple in design, economical to manufacture, readily adaptable to a plurality of energy dissipation uses and leveling uses, easy to install, easy to remove and provides improved shock absorption and vehicle leveling.

BRIEF SUMMARY OF THE INVENTION

In accordance with the present invention, there is provided a self-leveling viscous spring damper particularly suited for shock absorption, damping, leveling of structural agitation and energy dissipation. The new self-leveling viscous elastic damper is generally comprised of an outer member connected by an elastomeric shear spring to an inner member. A main fluid chamber is disposed between the inner and outer members and communicates with a second fluid chamber in the inner member through restricted orifice means and a third fluid chamber in the outer member through pump means. An expandible and contractible gas chargeable elastomeric bladder is included in the second chamber, with a valve means for selectively charging the bladder with gas pressure. An elastomeric gas accumulator is included in the third fluid chamber with a valve means for selectively charging the gas accumulator with gas pressure.

In accordance with another aspect of the invention, an elastomeric diaphragm is connected between the pump means and a peripheral wall of the outer member, and has a plurality of fluid conveyable passageways therein and further has a plurality of integrally formed yieldable flaps in overlying engagement upon ports in the pump means.

In accordance with yet another aspect of the present invention, bumper means are mounted to an end wall of the inner member for operative engagement with the diaphragm and with the pump means.

In accordance with a further aspect of the invention, the pump means includes a plurality of spaced grooves on the outer face of a portion thereof for conveying fluid from the main fluid chamber to the third fluid chamber.

In accordance with yet a further aspect of the present invention, the pump means includes a yieldable flapper valve contained therein and disposed to permit fluid flow only from the third fluid chamber to the main fluid chamber.

It is a principal object of the present invention to provide an improved self-leveling viscous spring damper having improved operating characteristics including a constant spring rate and damping response during leveling operation.

It is another object of the invention to provide an improved self-leveling spring damper having a pump means for leveling of the damper during shock absorption and energy dissipation.

It is yet another object of the invention to provide a self-leveling spring damper having an elastomeric diaphragm and an elastomeric gas accumulator for improved spring rate and damping response operation.

Other objects and advantages for the subject new self-leveling viscous spring damper will become apparent to those skilled in the art upon a reading and understanding of the specification.

BRIEF DESCRIPTION OF THE DRAWINGS

The invention may take physical form in certain parts and arrangement of parts, the preferred and an alternative embodiment of which will be described in detail in the specification and illustrated in the accompanying drawings which form a part hereof and wherein.

DETAILED DESCRIPTION OF THE INVENTION

Figure 1:
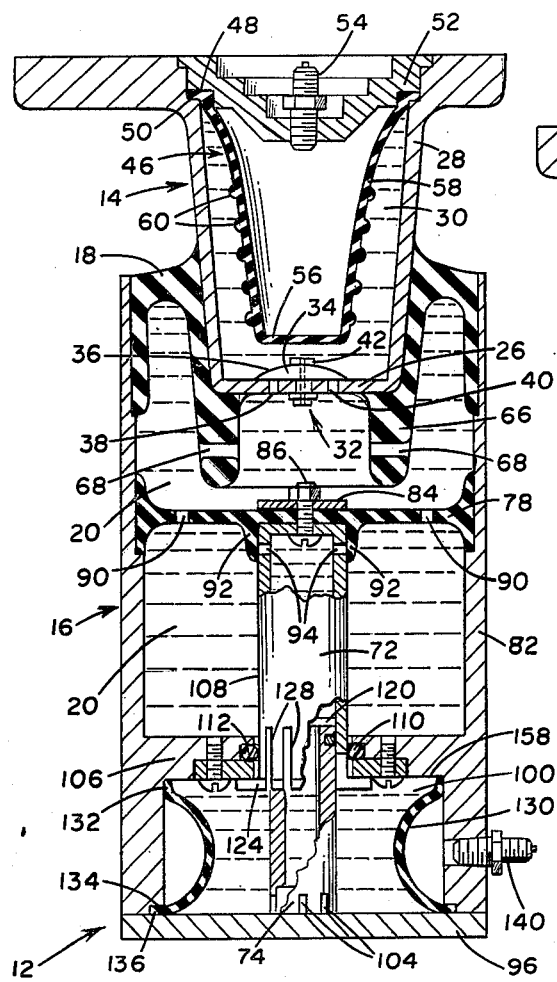
FIG. 1 is a cross-sectional elevational view of a self-leveling viscous spring damper constructed in accordance with the present invention.

Referring now to the drawings wherein the showings are for purposes of illustrating the preferred and an alternative embodiment of the invention only and not for purposes of limiting the same, the FIGURES show a self-leveling viscous spring damper 12 comprised of an inner member 14 and an outer member 16 connected by an elastomeric shear spring 18 which is bonded to a portion of the surfaces of the inner and outer members. A main or first fluid chamber 20 is disposed intermediate inner member 14 and outer member 16 and is at least partially contiguous with elastomeric shear spring 18. Inner member 14 includes an elongated cup-like portion including an end wall 26 and a peripheral wall 28 extending therefrom to enclose and elongated second fluid chamber 30. Orifice means generally indicated at 32 is provided for a transferring of fluid between fluid chamber 20 and 30. Typically, orifice means 32 comprises an elastomeric restrictor 34 having a yieldable flap 36 covering a plurality of passageways 38, 40 for blocking flow therethrough in one direction while providing flow in a reverse direction and through a central passageway 42.

An elongated expandible and contractible elastomeric bladder 46 is positioned within second fluid chamber 30, and has a circumferential mounting flange 48 secured between a circumferential shoulder 50 on inner member 14 and a cap member 52 which is press-fit or otherwise suitably secured to inner member 14. Cap member 52 has a valve means in the form of an air check valve 54 mounted thereon for selectively charging bladder 46 with variable gas pressure. Bladder 46 is shaped to generally conform with the shape of second fluid chamber 30, and includes a bladder end wall 56 facing inner member end wall 26 and a bladder peripheral wall 58 facing inner member peripheral wall 28.

Bladder 46 has a plurality of spaced wear means thereon for minimizing abrasion of the bladder. This makes it possible to omit machining of the interior of second fluid chamber 30. The wear means may take different forms and in one arrangement, comprises a plurality of axially spaced outwardly projecting circumferential rings 60 integral with bladder peripheral wall 58. Bladder end wall 56 may also be substantially thicker than the remainder of the bladder to provide abrasion resistance. When bladder 46 expands and contracts, it rubs against the interior of inner member end wall 26 and peripheral wall 28, and wear means 60 minimizes any danger of rupturing the bladder. Rings 60 are sufficiently close together, and the bladder wall therebetween is sufficiently thick, to prevent the bladder from bulging outwardly between adjacent rings into contact with the surface of inner member peripheral wall 28. Circumferential rings 60 also trap hydraulic fluid therebetween for maintaining lubricant along the peripheral wall of bladder 46 to further minimize abrasion thereof.

Bumper means in the form of an elastomeric annulus 66 is preferably integrally formed to elastomeric shear spring 18 within main fluid chamber 20. Bumper 66 may also be attached to end wall 26 in any suitable manner, including mold bonding, mechanical fasteners or chemical adhesion. A plurality of spaced radially extending apertures 68 are included in annulus 66 for conveying fluid therethrough.

Pump means in the form of a first upper cup-like portion 72 slideably received on opposed cup-like second portion 74 is included in outer member 16. An elastomeric diaphragm 78 connects the pump first portion to outer member peripheral wall 82. Diaphragm 78 is typically bonded to peripheral wall 82 and attached to pump first portion by use of a retaining disc 84 and a threaded fastening member 86. The diaphragm 78 and pump first portion 72 are positioned to be engaged by bumper 66 during compressive telescoping of the damper. A plurality of identical fluid conveyable passageways 90 are included in diaphragm 78 to preclude sealing off the orifice means 32 and therefore second fluid chamber 30 when the bumper 66 is in engagement with the diaphragm. In addition, a plurality of identical integrally formed yieldable flaps 92 in diaphragm 78 are disposed in overlying engagement with pump ports 94 in pump first portion 72 to seal the pump first portion during periods when the pump is not operating.

Pump second portion 74 is secured to outer member end wall 96 in a third fluid chamber 100 and is therefore fixed relative to outer member 16. A plurality of pump second portion ports 104 are included for the ingress of fluid into pump second portion 74 from third fluid chamber 100 during pump operation. Partitioning wall 106 is preferably integrally formed in outer member 16 and extends radially inward to closely abut outer peripheral surface 108 of pump first portion 72. Main fluid chamber 20 is separated from the third fluid chamber by the partitioning wall. A sealing O-ring 110 is mounted between outer surface 108 and the end wall 112 of partitioning wall 106 to seal fluid flow from third fluid chamber 100 to main fluid chamber 20. In addition, one-way elastomeric flapper valve 120 is mounted in pump second portion 74 to allow fluid flow in a direction from the pump second portion fluid chamber to the pump first portion fluid chamber only. At the terminal end 124 of the pump first portion 72 opposite diaphragm 78 a plurality of identical, axially extending spaced grooves 128 are disposed on a section thereof for conveying fluid from the main fluid chamber 20 to the third fluid chamber 100 when grooves 128 are disposed adjacent sealing ring 110.

An elastomeric gas accumulator 130 is included in the third fluid chamber 100. Opposed circumferential mounting flanges 132, 134 are used to affix gas accumulator 130 to outer member 16 by securing flanges 132, 134 between circumferential shoulder 136 on outer member end wall 96 and outer member peripheral wall 82 and circumferential shoulder 138 on partitioning wall 106 and outer member peripheral wall 82, respectively. Valve means in the form of air check valve 140 mounted in peripheral wall 82 is utilized for selectively charging gas accumulator 130 with variable gas pressure.

Figure 3:
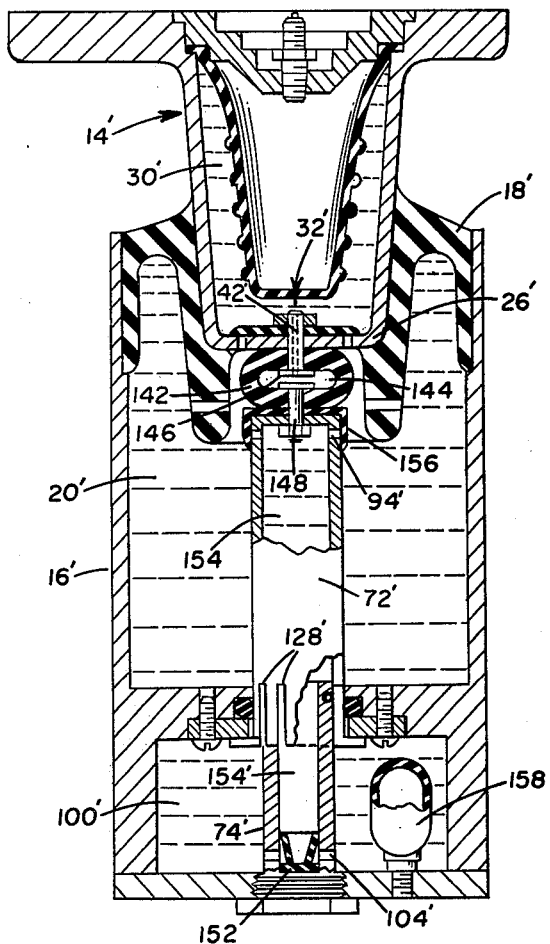
FIG. 3 is a cross-sectional elevational view of an alternative embodiment of a self-leveling viscous spring damper constructed in accordance with the present invention.

FIG. 3 illustrates an alternate embodiment of the invention where pump means in the form of a first upper cup-like portion 72' slideably received on opposed cup-like second portion 74' is included in outer member 16'. An elastomeric connecting ring 142 connects the pump first portion to inner member end wall 26' at restricted orifice means 32' and allows relative movement between the pump and the end wall in both axial and radial directions. Elastomeric connecting ring 142 is open-ended to allow fluid passage from main fluid chamber 20' to second fluid chamber 30' through opening 144 and central passageway 42'. Conventional fastening means for securing ring 142 to inner member 14' and pump first portion 72' may be utilized such as open-ended flanged member 146 and flanged member 148.

Check valve means such as flapper valve 152 in pump second portion 74' adjacent ports 104' allows fluid flow in a direction from third fluid chamber 100' to the pump fluid chamber 154 only. Similarly, rubber flapper valve 156 adjacent ports 94' allows fluid flow in a direction from the pump fluid chamber 154 to the main fluid chamber 20' only.

Means for controlling the pressure of third fluid chamber 100' such as selectively pressurable elastomeric vessel 158 is included therein to prevent negative fluid pressure during operation in the third fluid chamber.

Operation

The self-leveling viscous spring damper 12 may be used as a shock absorber or leveler on vehicles, or on machinery supports or the like. When used on vehicles inner member 14 is connected directly or indirectly to the vehicle body, while outer member 16 is connected directly or indirectly to the vehicle axle. Relative telescoping axial movement between inner and outer members 14, 16 stresses elastomeric shear spring 18 and elastomeric diaphragm 78, varies the volumes of bladder 46 and gas accumulator 130 and operates the pump means.

Figure 2:
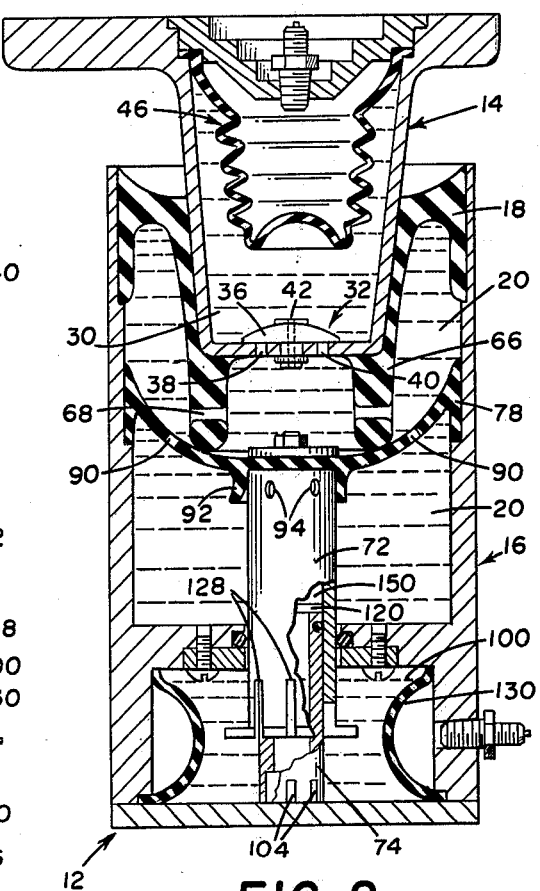
FIG. 2 is a cross-sectional elevational view of the invention shown in FIG. 1 in a compressed state.

With particular attention to FIG. 2, when the inner and outer members quickly receive telescoping compressive force, the main fluid chamber 20 is compressed and bumper 66 operates to compress the pump first portion fluid chamber 150 and stress diaphragm 78. Main fluid chamber 20 is compressed due to the reduction in chamber space by the telescoping movement of inner member 14 relative to outer member 16. Pump chamber 150 is compressed due to the reduction in volume of chamber 150 as first portion 72 is slideably received over second portion 74 and flapper valve 120 is closed. Shear spring 18 and diaphragm 78 exhibit a spring-like opposition to the compressive force upon damper 12 due to their elastomeric deflections from their normal state.

A damping response to the compressive force upon damper 12 is produced by the flow of fluid from suddenly pressurized main fluid chamber 20 to second fluid chamber 30 through restricted orifice means 32. Fluid is conveyed from the main fluid chamber through the central passageway 42 and passageways 38, 40 around yieldable flap 36. As fluid flows into second fluid chamber 30, bladder 46 is compressed and pressurized to reduce bladder volume. In addition, a damping response is exhibited due to the flow of fluid from pump first portion fluid chamber 150 through pump ports 94 around yieldable flaps 92 into the main fluid chamber 20. Fluid flow through diaphragm passageways 90 and bumper apertures 68 also exhibits a damping response. All of these forces combine during the telescopic compressive movement of damper 12 to absorb and dampen shock and dissipate energy.

After the shock has been absorbed, damper 12 operates to return to an equilibrium position which is a level position for the support structure of the damper. As shear spring 18 and diaphragm 78 force expansion of the inner member from the outer member after compression, the volume of the main fluid chamber 20 is expanded and the diaphragm 78 draws the pump first portion 72 away from the pump second portion 74, thereby expanding the volume of pump first portion fluid chamber 150. Such volume expansions create vacuum forces which draw fluid from second fluid chamber 30 through central passageway 42, and from pump first portion fluid chamber 150 through ports 94 around yieldable flaps 92. In addition, during pump expansion, flapper valve 120 is opened and fluid is drawn from third fluid chamber 100 through pump second portion ports 104, through the pump second portion 74, through flapper valve 120 into pump first portion 72. It has been observed that fluid so-drawn has a flow energy to overcome yieldable flaps 92 and pass into main fluid chamber 20 through ports 94. Gas accumulator 130 expands into the third fluid chamber upon the passage of fluid from the chamber through the pump means into the main fluid chamber 20.

The pump means thus operates to pump fluid into the main fluid chamber 20 during both compression and expansion of the damper 12. This pumping of fluid will continue as a result of the compressive and expansive movements until the main fluid chamber has sufficiently expanded and pump first portion 72 has risen to a level where space grooves 128 will allow fluid to return from the main fluid chamber to the third fluid chamber. This level is the rest equilibrium level of the damper 12.

With particular attention to FIG. 3, the operating procedures of an alternative embodiment of the invention are illustrated. Relative compressive movement between inner and outer members 14', 16', reduces the volume in main fluid chamber 20' and causes fluid to flow into second fluid chamber 30' in a manner as hereinbefore disclosed to absorb shock and dissipate energy. Further, pump first portion 72' is telescoped over pump second portion 74' as axial movement of inner member 14' is transmitted to the pump means through elastomeric connector ring 142. Ring 142 is preferably constructed of flexible material to prevent non-axial relative movement between members 14', 16' from forcing the pump means into a non-aligned disposition. As the pump means is compressed fluid in the pump fluid chamber is forced into main fluid chamber 20' through ports 94' and around yieldable flapper valve 156. Simultaneously, flapper valve 152 seals ports 104' to prevent fluid from flowing into third fluid chamber 100'. As additional fluid is pumped into main fluid chamber 20', the pressure causes the chamber 20' to tend to expand and thereby expand the viscous spring damper 12'. Stressed shear spring 18' also tends to expand the damper in response to a compressive force. During expansion fluid is drawn from third fluid chamber 100' through ports 104' into the pump fluid chamber 154. Elastomeric vessel 158 expands into the third fluid chamber 100' upon the passage of fluid therefrom. Similarly as in the preferred embodiment, fluid so drawn from the third chamber will flow into the main fluid chamber 20'.

Pumping of fluid will so continue during compressive and expansive movements of the damper 12' until the main fluid chamber 20' has sufficiently expanded and pump first portion 72' has risen to a level where valve means such as space grooves 128' will allow fluid to return from the main fluid chamber 20' to the third fluid chamber 100'. This level is the rest equilibrium level.

Figure 4:
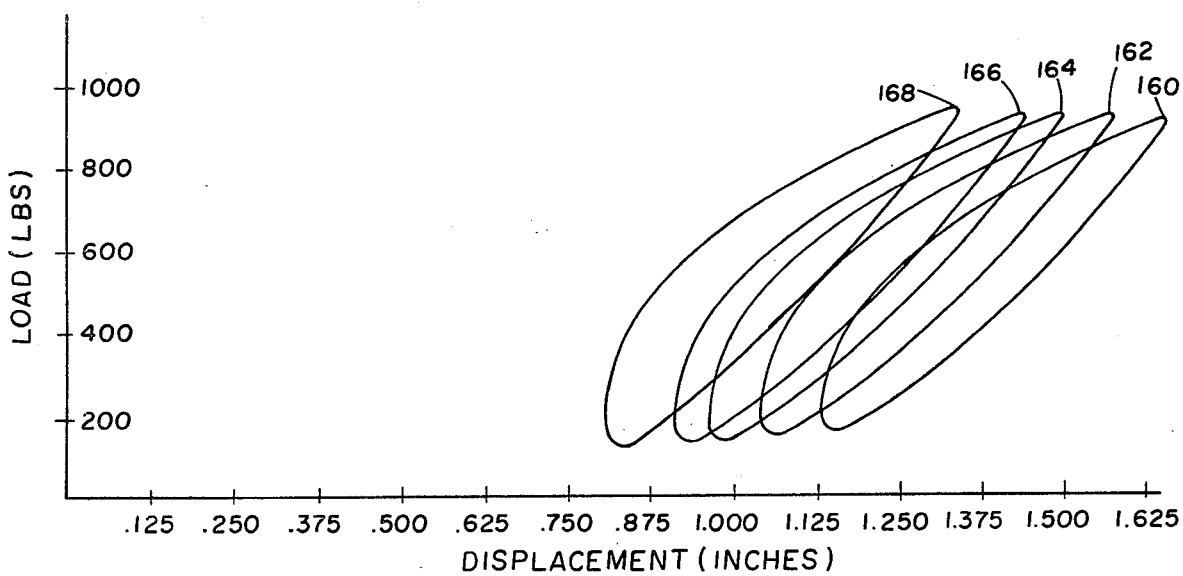
FIG. 4 is a graph showing the deflection and leveling characteristics of the invention.

With particular reference to FIG. 4 the improved operating characteristics of the invention are illustrated. FIG. 4 shows five closed curves 160, 162, 164, 166, 168. Curve 160 is a load/deflection curve of the subject invention after it has been deflected to a certain position and then oscillated about that point. The shape of the curve illustrates that the subject invention has both a spring rate and a damping response in both telescopic compression and rebound expansion movement of the damper 12. Curves 162, 164 and 166 are load/deflection curves of the subject invention to oscillations after identical intervals of time have passed from the time of the original deflection. They illustrate that the medium deflection of the damper 12 is reducing, i.e., the damper is leveling, but that the operational response to the oscillating forces result in identically shaped curves as original curve 160. This represents an exhibition of a constant spring rate and damping response during the leveling operation. Curve 168 illustrates a response to an oscillating force after the damper has returned to its level position. Curve 168 also is an identical shape to the prior curves. During the entire leveling operation the invention exhibited constant spring rate and damping response to the oscillating forces, despite a variable deflection.

The subject invention is wholly self-contained and can be used as a complete vehicle suspension. It possesses a load capacity and the means to support and deflect the load to a preselected level position, while uniformly absorbing shocks to the load.

The invention has been described with reference to the preferred embodiment. Obviously, modifications and alterations will occur to others upon a reading and understanding of the specification. It is our intention to include all such modifications and alterations insofar as they come within the scope of the appended claims or the equivalents thereof.

Having thus described the invention, we now claim:

1. In a viscous spring damper including inner and outer members connected by an elastomeric shear spring; having a main fluid chamber therebetween communicating with a second chamber in said inner member through restricted orifice means, an expandible and contractible gas chargeable elastomeric bladder in said second chamber, and first valve means for selectively charging said bladder with gas pressure, said members being relatively movable for stressing said shear spring and varying the volumes of said chambers while effecting fluid flow therebetween through said orifice means, the improvement comprising: a third fluid chamber in said outer member communicating with said main fluid chamber through restricted pump means, whereby relative movement between said members operates said pump means for leveling said viscous elastic damper.

2. The viscous elastic damper of claim 1 wherein said pump means includes a first portion in said main fluid chamber and a second portion in said third fluid chamber, said second portion being mounted to an end wall of said outer member.

3. The viscous elastic damper of claim 2 wherein a diaphragm is connected to said pump means first portion and a peripheral wall of said outer member.

4. The viscous elastic damper of claim 3 wherein said diaphragm includes a plurality of fluid conveying apertures and a plurality of integrally formed flaps, said flaps being disposed in a yieldable sealing engagement to associated ports in said pump means.

5. The viscous elastic damper of claim 2 wherein said pump means further includes a first portion fluid chamber and a second portion fluid chamber, one-way valve means disposed therebetween and a plurality of fluid inlets in said second portion communicating said pump means second portion fluid chamber with said third fluid chamber.

6. The viscous elastic damper of claim 5 wherein said one-way valve means comprises a yieldable rubber flapper valve mounted to a peripheral wall of said pump means second portion.

7. The viscous elastic damper of claim 5 wherein a partitioning wall is disposed intermediate said diaphragm and said end wall of said outer member for partitioning said main fluid chamber from said third fluid chamber.

8. The viscous elastic damper of claim 7 wherein said wall is integrally formed with said outer member and is circumferentially disposed about said pump first portion in fluid sealing engagement to said pump means first portion.

9. The viscous elastic damper of claim 8 wherein said pump means first portion includes a plurality of spaced grooves in a peripheral wall outer face of said pump means first portion, said grooves axially-extending over a section of said outer face contiguous to a terminal end of said first portion opposite said diaphragm.

10. The viscous elastic damper of claim 7 wherein said third fluid chamber includes an elastomeric gas accumulator disposed about a peripheral wall of said third fluid chamber and second valve means for selectively charging said accumulator.

11. The viscous elastic damper of claim 10 wherein said gas accumulator extends from said outer member end wall to said partitioning wall.

12. A viscous elastic damper for damping and leveling structural agitation comprising:
an inner member at least partially received in an outer member and joined to said outer member by means of an elastomeric shear spring;
a main fluid chamber in said outer member communicable with a second fluid chamber in said inner member through restricted orifice means, said main fluid chamber further communicable with a third fluid chamber in said outer member, separated from said main fluid chamber by a partitioning wall interposed between said inner member and an end wall of said outer member;
a first elastomeric means for selective gas accumulation and pressurization with first associated valve means in said second fluid chamber;
a second elastomeric means for selective gas accumulation and pressurization with second associated valve means in said third fluid chamber;
a pump means extending through said partitioning wall from said third fluid chamber to said main fluid chamber having pump ports in said main fluid chamber and in said third fluid chamber; and
an elastomeric diaphragm in said main fluid chamber connecting said pump means to said outer member, said diaphragm having a plurality of fluid-conveyable passageways therein and further having a plurality of integrally formed yieldable flaps in overlying engagement with said main fluid chamber pump ports, whereby relative movement between said members operates to stress said shear spring and said elastomeric diaphragm, vary the volumes of said first and said second elastomeric means and operate said pump means to level said viscous elastic damper.

13. The viscous elastic damper of claim 12 including bumper means mounted to an end wall of said inner member for operative engagement with said diaphragm and said pump means.

14. The viscous elastic damper of claim 13 wherein said bumper means comprises an elastomeric annulus extending outwardly from said inner member towards said outer member and having a plurality of radially extending apertures for conveying fluid therethrough.

15. The viscous elastic damper of claim 12 wherein said pump means includes a first portion slideably received on a second portion, said first portion having a plurality of spaced grooves on a section thereof for communicating said main fluid chamber with said third fluid chamber.

16. The viscous elastic damper of claim 15 wherein said pump means has a yieldable flapper valve contained therein disposed to permit fluid flow only from said pump means second portion to said pump means first portion.

17. A self-leveling support assembly comprising:
a first member including a first fluid chamber elastomerically connected to a second member including a second and a third fluid chamber;
a partitioning wall separating said second fluid chamber from said third fluid chamber;
pump means for pumping fluid from said third fluid chamber to said second fluid chamber comprising a first pump portion having a first fluid port in said second fluid chamber, extending at least partially into said third fluid chamber in fluid sealing engagement through said partitioning wall and slideably received on a second pump portion having a second fluid port in said third fluid chamber, means for operatively engaging said first member to said pump first portion, means for operatively engaging said second member to said pump second portion, first valve means for allowing fluid flow in a direction from said fluid third chamber through said pump means and into said second fluid chamber and second valve means for allowing fluid flow in a direction from said second fluid chamber to said third fluid chamber, whereby relative movement between said members operates said pump means to level said support assembly.

18. The self-leveling support assembly of claim 1 wherein a means for controlling fluid pressure is included in said third fluid chamber.

* * * * *